(12) United States Patent
Lin et al.

(10) Patent No.: US 11,423,143 B1
(45) Date of Patent: Aug. 23, 2022

(54) ANOMALY DETECTION BASED ON PROCESSES EXECUTED WITHIN A NETWORK

(71) Applicant: Exabeam, Inc., San Mateo, CA (US)

(72) Inventors: Derek Lin, San Mateo, CA (US); Barry Steiman, San Ramon, CA (US); Domingo Mihovilovic, Menlo Park, CA (US); Sylvain Gil, San Francisco, CA (US)

(73) Assignee: Exabeam, Inc., Foster City, CA (US)

( * ) Notice: Subject to any disclaimer, the term of this patent is extended or adjusted under 35 U.S.C. 154(b) by 891 days.

(21) Appl. No.: 16/228,071

(22) Filed: Dec. 20, 2018

Related U.S. Application Data

(60) Provisional application No. 62/609,121, filed on Dec. 21, 2017.

(51) Int. Cl.
*G06F 21/00* (2013.01)
*G06F 21/55* (2013.01)
*G06F 21/56* (2013.01)
*G06F 11/34* (2006.01)
*G06N 7/00* (2006.01)

(52) U.S. Cl.
CPC ........ *G06F 21/552* (2013.01); *G06F 11/3419* (2013.01); *G06F 11/3452* (2013.01); *G06F 21/554* (2013.01); *G06F 21/566* (2013.01); *G06N 7/005* (2013.01); *G06F 2201/81* (2013.01)

(58) Field of Classification Search
CPC .. G06F 2201/81; G06F 21/566; G06F 21/554; G06F 11/3452; G06F 11/3419; G06F 21/552; G06N 7/005

USPC .......................................................... 726/23
See application file for complete search history.

(56) References Cited

U.S. PATENT DOCUMENTS

| | | |
|---|---|---|
| 5,941,947 A | 8/1999 | Brown et al. |
| 6,223,985 B1 | 5/2001 | DeLude |
| 6,594,481 B1 | 7/2003 | Johnson et al. |
| 7,181,768 B1 | 2/2007 | Ghosh et al. |

(Continued)

OTHER PUBLICATIONS

Bahnsen, Alejandro Correa "Classifying Phishing URLs Using Recurrent Neural Networks", IEEE 2017.

(Continued)

*Primary Examiner* — Josnel Jeudy
(74) *Attorney, Agent, or Firm* — Lessani Law Group, PC (57) ABSTRACT

A cybersecurity system, method, and computer program is provided for detecting whether an entity's collection of processes during an interval is abnormal compared to the historical collection of processes observed for the entity during previous intervals of the same length. Logs from a training period are used to calculate global and local risk probabilities for each process based on the process's execution history during the training period. Risk probabilities may be computed using a Bayesian framework. For each entity in a network, an entity risk score is calculated by summing the applicable risk probabilities of the unique processes executed by the entity during an interval. An entity's historical risk scores form a score distribution. If an entity's current score is an outlier on the historical score distribution, an alert of potentially malicious behavior is generated with respect to the entity. Additional post-processing may be performed to reduce false positives.

20 Claims, 4 Drawing Sheets

(56) References Cited

U.S. PATENT DOCUMENTS

| | | |
|---|---|---|
| 7,624,277 B1 | 11/2009 | Simard et al. |
| 7,668,776 B1 | 2/2010 | Ahles |
| 8,326,788 B2 | 12/2012 | Allen et al. |
| 8,443,443 B2 | 5/2013 | Nordstrom et al. |
| 8,479,302 B1 | 7/2013 | Lin |
| 8,484,230 B2 | 7/2013 | Harnett et al. |
| 8,539,088 B2 | 9/2013 | Zheng |
| 8,583,781 B2 | 11/2013 | Raleigh |
| 8,606,913 B2 | 12/2013 | Lin |
| 8,676,273 B1 | 3/2014 | Fujisake |
| 8,850,570 B1 | 9/2014 | Ramzan |
| 8,881,289 B2 | 11/2014 | Basavapatna et al. |
| 9,055,093 B2 | 6/2015 | Borders |
| 9,081,958 B2 | 7/2015 | Ramzan et al. |
| 9,185,095 B1 | 11/2015 | Moritz et al. |
| 9,189,623 B1 | 11/2015 | Lin et al. |
| 9,202,052 B1* | 12/2015 | Fang ............... G06F 21/56 |
| 9,680,938 B1 | 6/2017 | Gil et al. |
| 9,690,938 B1 | 6/2017 | Saxe et al. |
| 9,692,765 B2 | 6/2017 | Choi et al. |
| 9,760,240 B2 | 9/2017 | Maheshwari et al. |
| 9,779,253 B2 | 10/2017 | Mahaffey et al. |
| 9,798,883 B1 | 10/2017 | Gil et al. |
| 9,843,596 B1 | 12/2017 | Averbuch et al. |
| 9,898,604 B2 | 2/2018 | Fang et al. |
| 10,063,582 B1 | 8/2018 | Feng et al. |
| 10,095,871 B2 | 10/2018 | Gil et al. |
| 10,178,108 B1 | 1/2019 | Lin et al. |
| 10,354,015 B2 | 7/2019 | Kalchbrenner et al. |
| 10,419,470 B1 | 9/2019 | Segev et al. |
| 10,445,311 B1 | 10/2019 | Saurabh et al. |
| 10,467,631 B2 | 11/2019 | Dhurandhar et al. |
| 10,474,828 B2 | 11/2019 | Gil et al. |
| 10,496,815 B1 | 12/2019 | Steiman et al. |
| 10,621,343 B1 | 4/2020 | Maciejak et al. |
| 10,645,109 B1 | 5/2020 | Lin et al. |
| 10,685,293 B1 | 6/2020 | Heimann et al. |
| 10,803,183 B2 | 10/2020 | Gil et al. |
| 10,819,724 B2 | 10/2020 | Amiri et al. |
| 10,841,338 B1 | 11/2020 | Lin et al. |
| 10,887,325 B1 | 1/2021 | Lin et al. |
| 10,944,777 B2 | 3/2021 | Lin et al. |
| 11,080,591 B2 | 8/2021 | van den Oord et al. |
| 11,140,167 B1 | 10/2021 | Lin et al. |
| 11,245,716 B2* | 2/2022 | Roelofs ............... H04L 63/1416 |
| 2002/0107926 A1 | 8/2002 | Lee |
| 2003/0147512 A1 | 8/2003 | Abburi |
| 2004/0073569 A1 | 4/2004 | Knott et al. |
| 2006/0090198 A1 | 4/2006 | Aaron |
| 2007/0156771 A1 | 7/2007 | Hurley et al. |
| 2007/0282778 A1 | 12/2007 | Chan et al. |
| 2008/0028467 A1* | 1/2008 | Kommareddy ..... H04L 63/1458 726/23 |
| 2008/0040802 A1 | 2/2008 | Pierson et al. |
| 2008/0170690 A1 | 7/2008 | Tysowski |
| 2008/0262990 A1 | 10/2008 | Kapoor et al. |
| 2008/0301780 A1 | 12/2008 | Ellison et al. |
| 2009/0144095 A1 | 6/2009 | Shahi et al. |
| 2009/0171752 A1 | 7/2009 | Galvin et al. |
| 2009/0293121 A1 | 11/2009 | Bigus et al. |
| 2010/0125911 A1 | 5/2010 | Bhaskaran |
| 2010/0269175 A1 | 10/2010 | Stolfo et al. |
| 2010/0284282 A1 | 11/2010 | Golic |
| 2011/0167495 A1 | 7/2011 | Antonakakis et al. |
| 2012/0278021 A1 | 11/2012 | Lin et al. |
| 2012/0316835 A1 | 12/2012 | Maeda et al. |
| 2012/0316981 A1 | 12/2012 | Hoover et al. |
| 2013/0080631 A1 | 3/2013 | Lin |
| 2013/0117554 A1 | 5/2013 | Ylonen |
| 2013/0197998 A1 | 8/2013 | Buhrmann et al. |
| 2013/0227643 A1 | 8/2013 | Mccoog et al. |
| 2013/0305357 A1 | 11/2013 | Ayyagari et al. |
| 2013/0340028 A1 | 12/2013 | Rajagopal et al. |
| 2014/0007238 A1 | 1/2014 | Magee |
| 2014/0090058 A1 | 3/2014 | Ward et al. |
| 2014/0101759 A1 | 4/2014 | Antonakakis et al. |
| 2014/0315519 A1 | 10/2014 | Nielsen |
| 2015/0026027 A1* | 1/2015 | Priess ................ G06Q 20/4016 705/35 |
| 2015/0039543 A1 | 2/2015 | Athmanathan et al. |
| 2015/0046969 A1 | 2/2015 | Abuelsaad et al. |
| 2015/0121503 A1 | 4/2015 | Xiong |
| 2015/0205944 A1 | 7/2015 | Turgeman |
| 2015/0215325 A1 | 7/2015 | Ogawa |
| 2015/0339477 A1 | 11/2015 | Abrams et al. |
| 2015/0341379 A1 | 11/2015 | Lefebvre et al. |
| 2015/0363691 A1 | 12/2015 | Gocek et al. |
| 2016/0005044 A1 | 1/2016 | Moss et al. |
| 2016/0021117 A1 | 1/2016 | Harmon et al. |
| 2016/0063397 A1 | 3/2016 | Ylipaavalniemi et al. |
| 2016/0292592 A1 | 10/2016 | Patthak et al. |
| 2016/0306965 A1 | 10/2016 | Iyer et al. |
| 2016/0364427 A1 | 12/2016 | Wedgeworth, III |
| 2017/0019506 A1 | 1/2017 | Lee et al. |
| 2017/0024135 A1 | 1/2017 | Christodorescu et al. |
| 2017/0127016 A1 | 5/2017 | Yu et al. |
| 2017/0155652 A1 | 6/2017 | Most et al. |
| 2017/0161451 A1 | 6/2017 | Weinstein et al. |
| 2017/0213025 A1 | 7/2017 | Srivastav et al. |
| 2017/0236081 A1 | 8/2017 | Grady Smith et al. |
| 2017/0264679 A1 | 9/2017 | Chen et al. |
| 2017/0318034 A1 | 11/2017 | Holland et al. |
| 2017/0323636 A1 | 11/2017 | Xiao et al. |
| 2018/0004961 A1 | 1/2018 | Gil et al. |
| 2018/0048530 A1 | 2/2018 | Nikitaki et al. |
| 2018/0063168 A1 | 3/2018 | Sofka |
| 2018/0069893 A1 | 3/2018 | Amit et al. |
| 2018/0075343 A1 | 3/2018 | van den Oord et al. |
| 2018/0089304 A1 | 3/2018 | Vizer et al. |
| 2018/0097822 A1 | 4/2018 | Huang et al. |
| 2018/0144139 A1 | 5/2018 | Cheng et al. |
| 2018/0157963 A1 | 6/2018 | Salti et al. |
| 2018/0165554 A1 | 6/2018 | Zhang et al. |
| 2018/0190280 A1 | 7/2018 | Cui et al. |
| 2018/0234443 A1 | 8/2018 | Wolkov et al. |
| 2018/0248895 A1 | 8/2018 | Watson et al. |
| 2018/0285340 A1 | 10/2018 | Murphy et al. |
| 2018/0288063 A1 | 10/2018 | Koottayi et al. |
| 2018/0288086 A1 | 10/2018 | Amiri et al. |
| 2018/0307994 A1 | 10/2018 | Cheng et al. |
| 2018/0322368 A1 | 11/2018 | Zhang et al. |
| 2019/0014149 A1 | 1/2019 | Cleveland et al. |
| 2019/0028496 A1 | 1/2019 | Fenoglio et al. |
| 2019/0034641 A1 | 1/2019 | Gil et al. |
| 2019/0066185 A1 | 2/2019 | More et al. |
| 2019/0080225 A1 | 3/2019 | Agarwal |
| 2019/0089721 A1 | 3/2019 | Pereira et al. |
| 2019/0103091 A1 | 4/2019 | Chen |
| 2019/0114419 A1 | 4/2019 | Chistyakov et al. |
| 2019/0124045 A1 | 4/2019 | Zong et al. |
| 2019/0132629 A1 | 5/2019 | Kendrick |
| 2019/0149565 A1 | 5/2019 | Hagi et al. |
| 2019/0182280 A1 | 6/2019 | La Marca et al. |
| 2019/0334784 A1 | 10/2019 | Kvernvik et al. |
| 2020/0021607 A1 | 1/2020 | Muddu et al. |
| 2020/0082098 A1 | 3/2020 | Gil et al. |
| 2020/0228557 A1 | 7/2020 | Lin et al. |
| 2020/0302118 A1 | 9/2020 | Cheng et al. |
| 2021/0089884 A1 | 3/2021 | Macready et al. |
| 2021/0125050 A1 | 4/2021 | Wang |
| 2021/0182612 A1 | 6/2021 | Zeng et al. |
| 2022/0006814 A1 | 1/2022 | Lin et al. |

OTHER PUBLICATIONS

Chen, Jinghui, et al., "Outlier Detection with Autoencoder Ensembles", Proceedings of the 2017 SIAM International Conference on Data Mining, pp. 90-98.

Cooley, R., et al., "Web Mining: Information and Pattern Discovery on the World Wide Web", Proceedings Ninth IEEE International Conference on Tools with Artificial Intelligence, Nov. 3-8, 1997, pp. 558-567.

(56) References Cited

OTHER PUBLICATIONS

Goh, Jonathan et al., "Anomaly Detection in Cyber Physical Systems using Recurrent Neural Networks", IEEE 2017.

Kim, Jihyun et al., "Long Short Term Memory Recurrent Neural Network Classifier for Intrusion Detection", IEEE 2016.

Poh, Norman, et al., "EER of Fixed and Trainable Fusion Classifiers: A Theoretical Study with Application to Biometric Authentication Tasks", Multiple Classifier Systems, MCS 2005, Lecture Notes in Computer Science, vol. 3541, pp. 1-11.

Taylor, Adrian et al., "Anomaly Detection in Automobile Control Network Data with Long Short-Term Memory Networks", IEEE 2016.

Taylor, Adrian "Anomaly-Based Detection of Malicious Activity in In-Vehicle Networks", Ph.D. Thesis, University of Ottawa 2017.

Wang, Shuhao et al., "Session-Based Fraud Detection in Online E-Commerce Transactions Using Recurrent Neural Networks", 2017.

Zhang, Ke et al., "Automated IT System Failue Prediction: A Deep Learning Approach", IEEE 2016.

Ioannidis, Yannis, "The History of Histograms (abridged)", Proceedings of the 29th VLDB Conference (2003), pp. 1-12.

DatumBox Blog, "Machine Learning Tutorial: The Naive Bayes Text Classifier", DatumBox Machine Learning Blog and Software Development News, Jan. 2014, pp. 1-11.

Freeman, David, et al., "Who are you? A Statistical Approach to Measuring User Authenticity", NDSS, Feb. 2016, pp. 1-15.

Malik, Hassan, et al., "Automatic Training Data Cleaning for Text Classification", 11th IEEE International Conference on Data Mining Workshops, 2011, pp. 442-449.

Wang, Alex Hai, "Don't Follow Me Spam Detection in Twitter", International Conference on Security and Cryptography, 2010, pp. 1-10.

* cited by examiner

FIG. 1

TRAINING PHASE

For each of the monitored processes, calculate a global risk probability of the process being used for a malicious attack
210

For each unique process-entity combination observed during the training period, calculate a local risk probability of the process being used on the entity for a malicious attack
220

Compute a historical set of risk scores for each entity based on monitored processes executed by the entity during the training period. Each training-period risk score for an entity is obtained by summing up the local risk probabilities of the unique monitored processes executed by the entity during an interval within the training period (e.g., for each entity, calculate a daily risk score for each day in the training period)
230

FIG. 2

PREDICTION PHASE

Compute a risk score for each entity by summing up the risk scores of each unique and monitored process executed by the entity during a prediction period. If a process/entity combination was observed during training, then the risk score for the corresponding process is the local risk probability for the entity/process combination. Otherwise, the risk score used for the process is the global risk probability.
310

↓

Determine whether any entity's risk score for the prediction period is anomalous compared to the entity's historical risk scores
320

↓

Perform post-prediction filtering or ranking on anomalous risk scores to reduce false-positive alerts
330

↓

Display alerts for anomalous risk scores
340

ANOMALY DETECTION BASED ON PROCESSES EXECUTED WITHIN A NETWORK

RELATED APPLICATIONS

This application claims the benefit of U.S. Provisional Application No. 62/609,121, filed on Dec. 21, 2017, and titled "Anomaly Detection Based on Process Executed within a Network," the contents of which are incorporated by reference herein as if fully disclosed herein.

BACKGROUND OF THE INVENTION

1. Field of the Invention

This invention relates generally to security analytics in computer networks and, more specifically, to anomaly detection based on processes executed within a network.

2. Description of the Background Art

Most of data breaches from enterprises and government organizations involve attackers leveraging stolen user credentials. Once credentials are stolen, they are used to gain access to assets where attackers may issue commands for actions to achieve what they want. Example actions may include privilege escalation and performing reconnaissance.

Cyber attackers are increasingly using "living off the land" attacks. Such attacks often involve using commands/process that an IT administrator would regularly use. These types of attacks can be more difficult to detect than those that involve installing malicious files on the target computer. Therefore, there is demand for a system that better detects living-off-the-land attacks.

SUMMARY OF THE DISCLOSURE

The present disclosure relates to a cybersecurity system, method, and computer program for detecting whether an entity's collection of processes during a period of time is abnormal compared to the historical collection of processes observed for the entity during past periods of the same length. In certain embodiments, the period of time is a day, and the system determines whether an entity's daily collection of processes is anomalous compared to a historical collection of daily processes observed for the entity.

In one embodiment, the method involves a training phase and a prediction phase, as described below.

Training Phase

The system obtains a certain amount of days of end point logs that track processes executed on end points in the network. The system uses the logs to identify certain processes executed by entities in the network during the training period. An entity may be a user or a host computer.

For each of a plurality of monitored processes, the system calculates a global risk probability of the process being used for a malicious attack, wherein a global risk probability for a process is based on the execution history of the process across all entities during the training period. For each unique monitored process-entity combination observed in the training period, the system calculates a local risk probability of the process being used on the entity for a malicious attack, wherein the local risk probability is based on the global risk probability of the process and the execution history of the process on the entity during the training period. In the preferred embodiment, a Bayes framework is used to calculate the global and local risk probabilities.

The system uses the local risk probabilities for entity/process combinations to compute a plurality of training-period risk scores for each entity. Each training-period risk score for an entity is obtained by summing up the local risk probability of each unique monitored processes executed by the entity during an interval within the training period. For example, for each day in the training period, the system may compute a daily risk score for each entity based on the unique monitored process executed by the entity that day.

Prediction Phase

During a prediction phase, the system computes a prediction-period risk score for each entity by summing up a risk score of each unique monitored process executed by the entity during the prediction period. For each process executed by an entity during the prediction period, the system determines whether the process/entity combination was observed during the training phase. If so, the risk score for the process is the local risk probability for the process/entity combination (e.g., the local Bayes risk for the process/entity combination). Otherwise, the risk score for the process is the process' global risk probability (e.g., the global Bayes risk).

For each entity, the system determines whether the entity's prediction-period risk score is anomalous compared to the entity's training-period risk scores. The system displays alerts in a user interface for anomalous prediction-period risk scores. Additional post-processing may be performed to reduce false positive alerts.

DETAILED DESCRIPTION OF THE PREFERRED EMBODIMENTS

The present disclosure relates to a system, method, and computer program for detecting whether an entity's collection of processes used during a period of time is abnormal compared to a historical collection of processes observed during past periods of the same length. Examples of processes are commands. An entity may be a user or a host computer. The method is performed by a computer system that monitors for potential cyberattacks to networks ("the system"). There are two phases in performing the method: (1) a training period in which the system determines an entity's historical set of daily (or other time period) processes and associated cybersecurity risk scores, and (2) a prediction period in which the system determines, for each entity, whether the cumulative cybersecurity risk associated with an entity's collection of process on a given day (or other period of time) is anomalous compared to the entity's historical distribution of cybersecurity risks scores. Both phases are described below.

1. Training

An entity's historical set of processes during defined intervals is determined with respect to a training period. For example, the training period may be a sliding window of N days (e.g., 30-60 days), and each interval may be a 24-hour day. As another example, the training period may be a sliding window of N weeks, and each interval may be one week.

Figure 1:
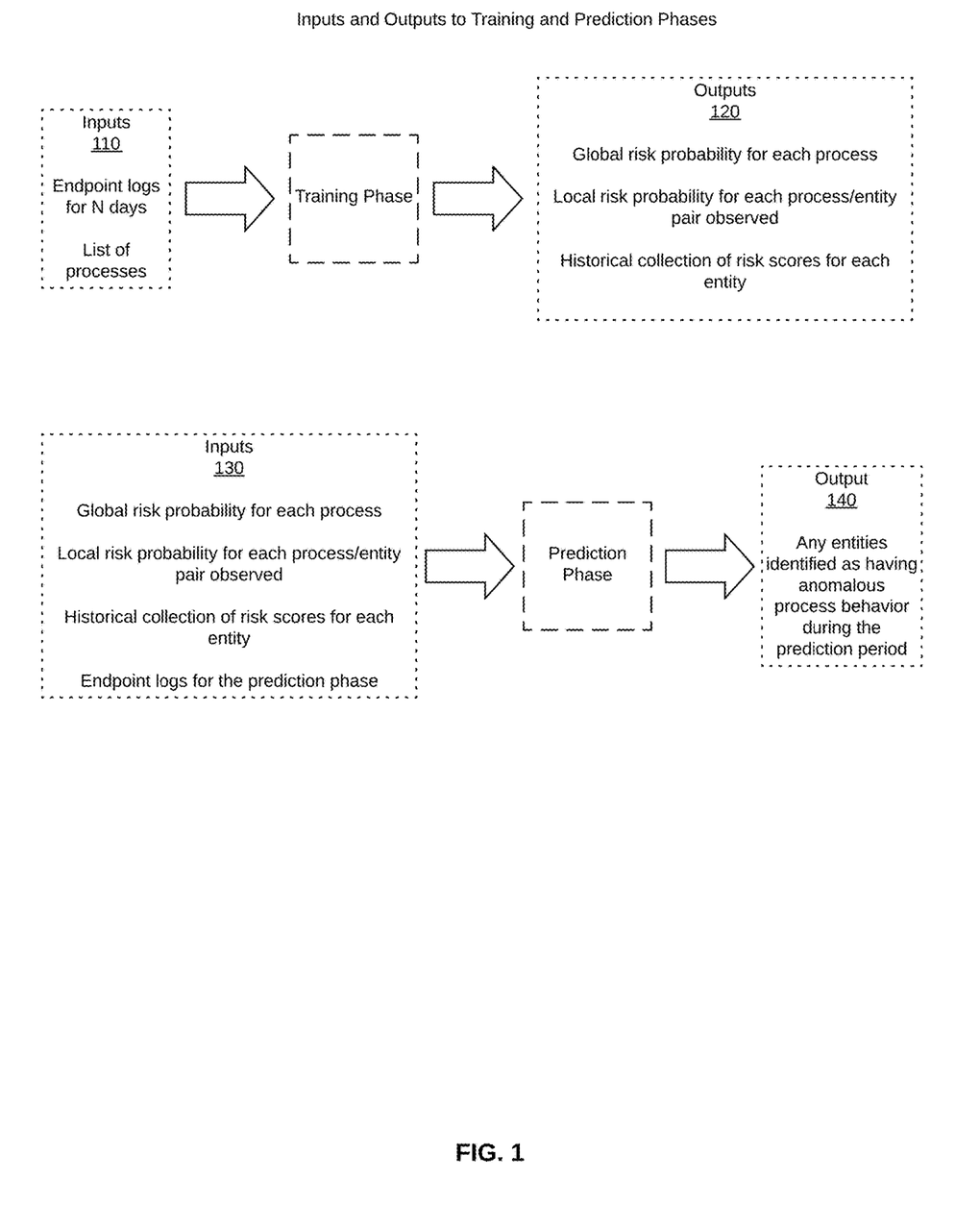
FIG. 1 is a block diagram illustrating inputs and outputs to the training phase and prediction phase according to one embodiment.

FIG. 1 illustrates inputs and outputs to the training phase. In one embodiment, the inputs 110 to the training phase are as follows:
- A certain number of days (e.g., 30-60) of endpoint logs that track executed processes on endpoints (e.g., Carbon Black logs); and
- A list of processes. In one embodiment, the list includes processes that are regularly used for legitimate purposes, but also have previously been used in malicious attacks. The list of processes is referred to herein as "the monitored processes."

In one embodiment, the outputs 120 to the training phase are as follows:
- For each process in the list, a global risk probability (also referred to herein as a "global risk score");
- A local risk probability for each process/entity combination observed in training (also referred to herein as a "local risk score"); and
- A historical set of risk scores for each entity, wherein each risk score corresponds to an interval within the training period. Each of the historical risk scores is obtained by summing the local risk probabilities of process executed by the entity during an interval within the training period (e.g., a daily risk score for each entity for each training day).

Figure 2:
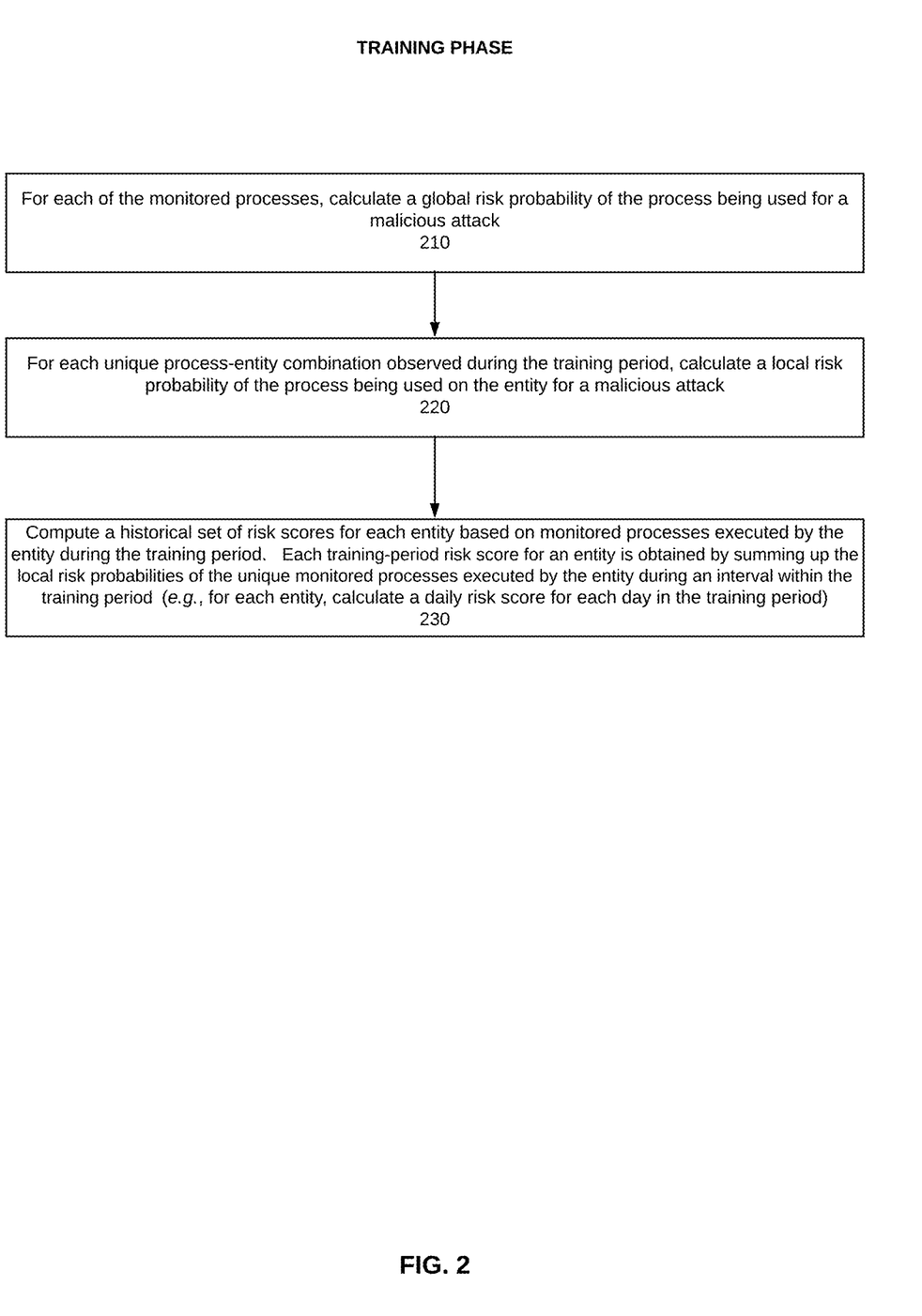
FIG. 2 is a flowchart illustrating a method performed with respect to a training phase for obtaining a historical collection of risk scores for an entity based on processes executed by the entity.

FIG. 2 illustrates a method for obtaining the above-listed outputs. The steps are described with respect to sections 1.1-1.3 below.

1.1 Compute Global Risk Probability for Each Monitored Process Over all Entities (Training Phase)

For each of the monitored processes, the system calculates a global risk probability of the process being used for a malicious attack (step 210) (referred to herein as the "global risk probability" or the "global risk score"). The global risk probability is based on the execution history of the process across all entities during the training period. In the preferred embodiment, a Bayesian framework is used to calculate the global risk probability. For example, the following Bayes formula may be used to calculate the global risk probability for a process (process=C below):

$$p(M|C) = \frac{p(C|M)p(M)}{p(C|M)p(M) + p(C|L)p(L)},$$

where
$p(M)$=prior probability of any event being malicious;
$p(L)$=prior probability of any event being legitimate;
$p(M|C)$=probability of any event being malicious given a process is executed. "C" represents process in the equations herein;
$p(L|C)$=probability of any event being legitimate given a process is executed;
$p(C|M)$=probability of a process C being in the malicious population; and
$p(C|L)$=probability of a process C being in the legitimate population.

Assuming $p(M)=p(L)=0.5$, we have $$p(M|C) = \frac{p(C|M)}{p(C|M) + p(C|L)}$$

$$p(C = c_i|M) = \frac{1}{n}.$$

where n equals to number of unique processes in the malicious population, which is the same as the number of unique process that are monitored. In an alternate embodiment, the probability of a process C being in the malicious population, $p(C|M)$, is manually assigned by a system administrator or domain expert based on past experience.

1.2 Compute Local Bayes Risk for Each Process/Entity Combination Observed in Training (Training Phase)

The system tracks which entities executed the monitored processes during the training phase. For each unique process-entity combination observed, the system calculates a local risk probability of the process being used on the entity for a malicious attack (step 220) (referred to herein as "a local risk probability" or a "local risk score"). The local risk probability for a given process-entity combination is based on the global risk probability for the process and the execution history of the process on the entity during the training period. In the preferred embodiment, a Bayesian framework is used to calculate the local risk probability. For example, the following Bayes formula may be used to calculate the local risk probability for a process (process=C below)/host (host=H) combination:

$$p(M|C, H) = \frac{p(C|M, H)p(M|H)}{p(C|M, H)p(M|H) + p(C|L, H)p(L|H)}$$

Where $p(M|C,H)$=probability of any event being malicious given a process "C" is executed on host "H."
Assuming $p(M|H)=p(M|C)$, we have $$p(M|C, H) = \frac{p(C|M, H)p(M|C)}{p(C|M, H)p(M|C) + p(C|L, H)p(L|C)},$$

where $p(M|C)$ is the computed global risk and $p(L|C)=1-p(M|C)$ $$p(C = c_i|L, H = h_j) = \frac{n_{i,j}}{\sum_{i=0}^{n_j} n_{i,j}},$$

where $n_{i,j}$ equals to number of unique pairs of (date, hour) when process $c_i$ was executed at host $h_j$ $$p(C = c_i|M, H = h_j) = \frac{1}{n_j},$$

where $n_j$ equals to number of unique commands executed in host $h_j$. In an alternate embodiment, the probability of a process C being in the malicious population on host H, p(C|M, H), is manually assigned by a system administrator or domain expert based on past experience.

In the above formulas, a host computer is the entity, but the above formulas can apply to a user as the entity.

1.2 Compute a Collection of Historical Risk Scores of Each Entity in History by Periodically Summing Up the Local Risk Scores for Each Process Executed by the Entity (Training Phase)

The system computes a historical set of risk scores for each entity based on monitored processes executed by the entity within the training period (step 230). Each historical risk score for an entity is obtained by summing up the local risk probabilities of the unique monitored processes executed by the entity during an interval within the training period. In other words, each entity's risk score is the sum of the local risk scores of the processes executed by the entity during an interval (e.g., a 24-hour day) within the training period. For example, if the interval is a 24-hour day, then for each training day, the system computes a daily risk score for each entity by summing up the local risk score of each unique (and monitored) process executed by the entity that training day. The collection of risk scores for an entity from the training period form a risk score distribution that is used to determine whether the entity's risk score in a future time period (i.e., a prediction period) is anomalous.

2. Prediction

After the training period, the output of the training can be used to identify anomalous process usage by an entity during a prediction period (e.g., a 24-hour day). FIG. 1 illustrates the inputs and outputs to the prediction phase. In one embodiment, the inputs 130 to the prediction phase are as follow:

- For each process monitored in the training phase, a global risk probability for the process;
- A local risk probability for each process/entity combination observed in training; and
- A historical set of risk scores for each entity from the training phase (e.g., a daily risk score for each entity for each training day).
- Endpoint logs for the prediction phase In one embodiment, the output 140 of the prediction phase is as follow:

- Any entities identified as having anomalous process behavior during the prediction period (e.g., a day).

Figure 3:
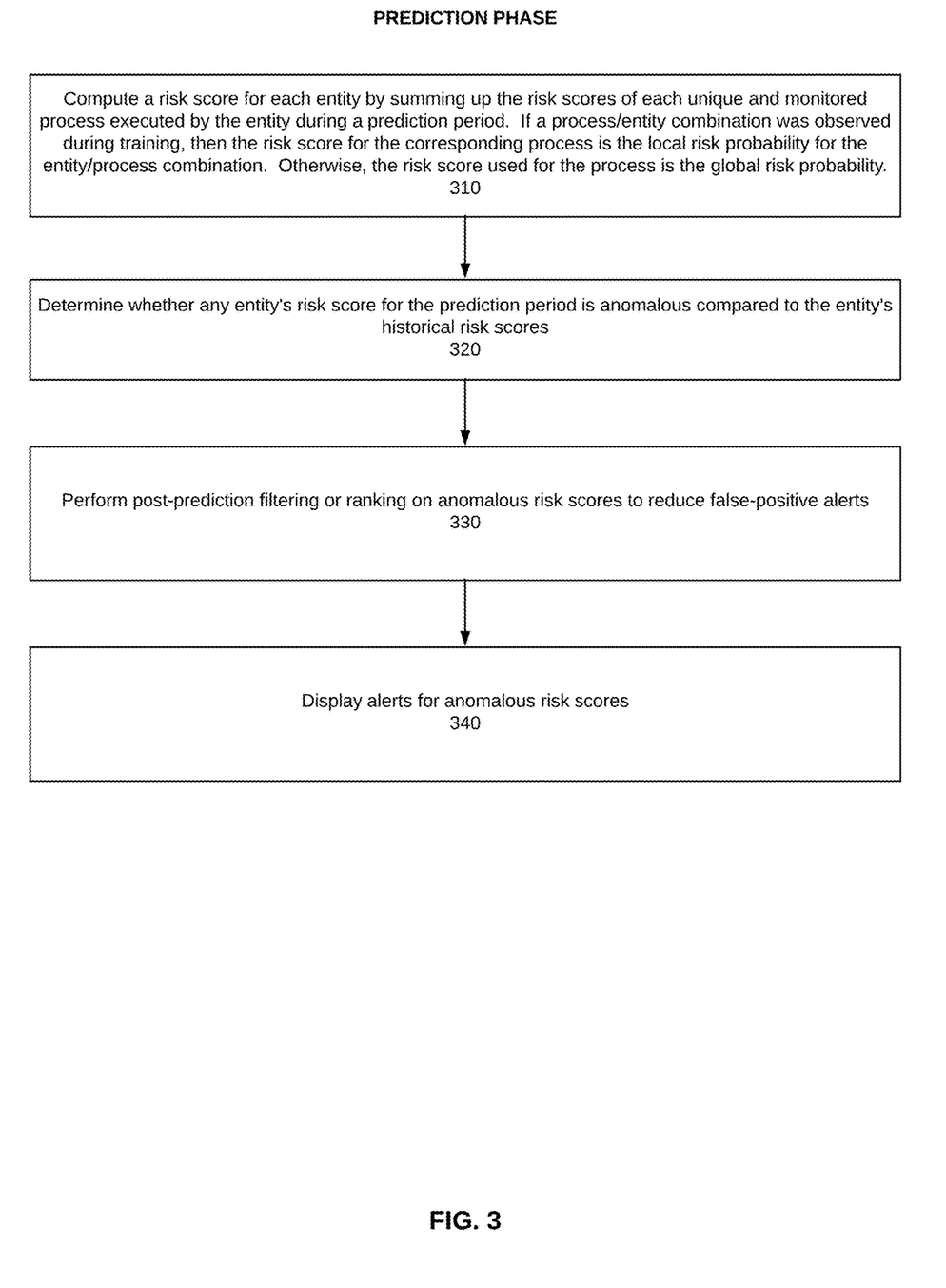
FIG. 3 is a flowchart illustrating a method performed with respect to a prediction phase for determining whether the processes executed by an entity during a prediction period are anomalous.

FIG. 3 illustrates a method for obtaining the above-listed output. The steps are described with respect to sections 2.1-2.4 below.

2.1 Compute Risk Score for Each Entity During a Prediction Period

The system computes a risk score for each entity by summing up the risk score of each unique process executed on the entity during a prediction period (e.g., a day) (step 310). For each process executed by an entity during the prediction period, the system determines whether the process/entity combination was observed during the training phase. If so, the risk score for the process is the local risk probability for the process/entity combination (e.g., the local Bayes risk for the process/entity combination). Otherwise, the risk score for the process is the process' global risk probability (e.g., the global Bayes risk).

The prediction period is equal to the length of an interval in the training period (i.e., the interval length with respect to which risk scores are calculated in the training period). For example, if daily risk scores are computed for each entity for each training day, then risk scores are computed on a daily basis in the prediction phase.

2.2 Determine Whether Prediction-Period Risk Score is Anomalous Compared to Risk Score Distribution from Training Phase The system determines whether any entity's risk score for the prediction period is anomalous compared to the entity's historical risk scores from the training period (step 320). In one embodiment, risk scores are calculated on a daily basis for each entity, and the system computes, for each entity, the p-value of the entity's daily risk score in the prediction phase compared to historical daily risk scores of the entity. If the computed p-value is less than a configured threshold, such as 0.02, the system flags the entity as having anomalous process usage during the prediction period.

Figure 4A:
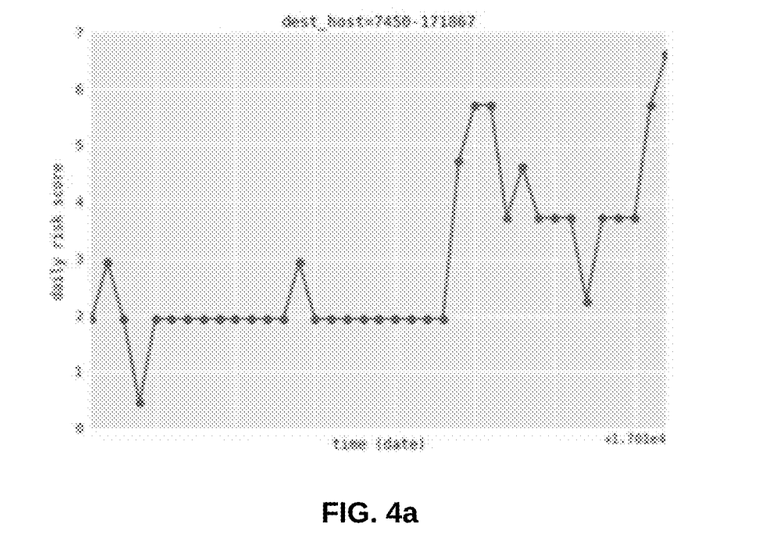
FIGS. 4a and 4b are examples of a daily risk score plot and associated histogram for an entity.
Figure 4B:
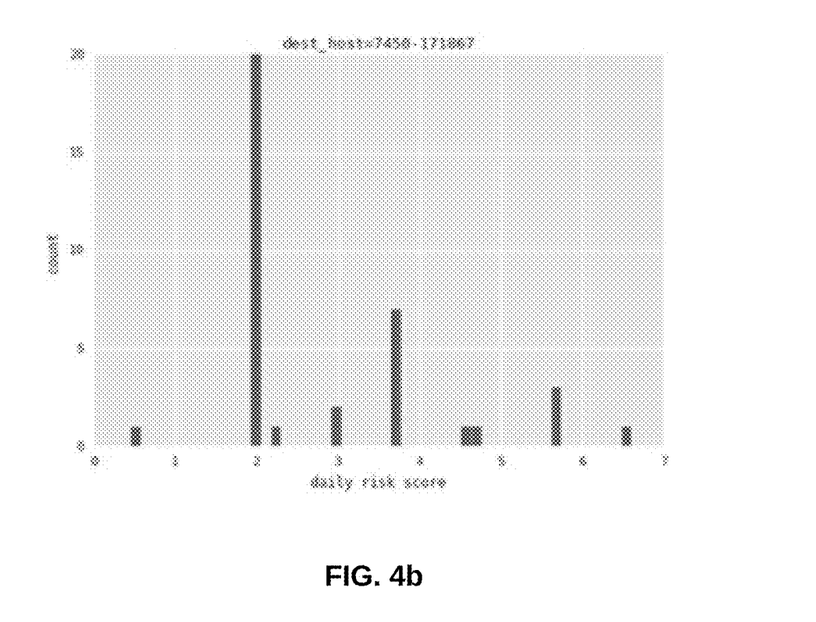

For example. FIG. 4a illustrates an example of a plot of a host computer's daily risk scores during a training period. FIG. 4b illustrates a histogram of the host's daily risk scores from the training period. If daily risk score for a prediction day=6.0, then the p-value would be calculated as follows:

$$p\text{-value}=(\text{sum of bin heights with daily score}>=6.0)/ \\ (\text{sum of all bin heights}) \text{ in the histogram in} \\ \text{FIG. 4}b.$$

2.3 Conduct Post Filtering to Reduce False Positives (Prediction Phase)

In certain embodiments, to reduce false positive alerts, the system conducts post-prediction filtering or ranking on anomalous risk scores for each prediction period (step 330).

There are various ways in which false positive alerts may be reduced. Below are some example ways to rank by determining a degree of anomaly associated with an anomalous prediction period for a user:

1. For each entity that is flagged as having an anomaly during a prediction period because of certain new processes executed by the entity during the prediction period, the system identifies the set of new processes from the prediction period that were not seen in the entity's training history. For example, if a histogram is used to track the processes executed by an entity and the prediction period is a day, the system would identify the processes executed by the entity on the anomalous day that were not previously seen in the entity's histogram.

2. The set of new processes executed by the entity during the prediction period is used to rank the entity's anomaly relative to other entities' anomalies using one of the following:

a. The system identifies the number of other entities whose historical models (e.g., histograms) containing this set of processes (i.e., the processes that are new to the subject entity), either all of them or some percentage of the processes. The system then ranks the anomaly for the current prediction period based on this number, where the more entities in the network having executed this set of processes in the past, the less anomalous the set is for the subject entity (i.e., the lower the subject entity's anomalous rank on the subject prediction day); OR b. Rank the anomaly by the ratio: (sum of scores of new processes/current prediction period score); OR c. Rank the anomaly by the ratio: (number of new processes/numbers of current prediction period processes).

3. The system uses the ranking to rank or filter alerts (e.g., select only the x % highest ranked alerts) or to indicate to an administrator a risk level associated with alerts. In certain embodiments, the system may use the ranking to determine whether a risk score rule is triggered or to weight the risk score accordingly.

In an alternate embodiment, the system ranks anomalies by the following ratio: (the current day score−historically closest score)/historically closest score.

2.3 Retraining with Sliding Window

In order to only use the latest data with respect to a prediction period, the system may use a sliding window of N days prior to the prediction period to re-calculate global and local risk scores. For example, the system may use a sliding window of the 60 days prior to the prediction day to recalculate the global and local risk scores.

2.4 Display Alerts for Anomalous Risk Scores

In certain embodiments, the system displays alerts for the x % highest ranking anomalous risk scores in a user interface that displays information related to potential cyber security threats (step 340). For example, the system may display an alert that an entity has anomalous process activity on a current day.

As described below, an entity's prediction-period risk score may also be used to determine if a rule, related to anomalous process execution, triggered in a UEBA system that calculates an overall risk score for a user session.

3. General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

In one embodiment, the computer system is a user/entity behavior analytics (UEBA) system used for network security. An example of a UEBA system is described in the U.S. Pat. No. 9,798,883, titled "System, Method, and Computer Program Product for Detecting and Assessing Security Risks in a Network, the contents of which are incorporated by reference herein. The output of the above-described methods (e.g., whether an entity's daily risk score is anomalous) may be applied to a rules engine of a UEBA system that calculates an overall risk score for an entity or user session. The output may be used to determine whether a rule is triggered for a user session, wherein the triggering of the rule results in an increased risk score for the user session. For example, the methods described herein may be performed by a modeling and anomaly detection module (such as module 1540 in U.S. Pat. No. 9,798,883, incorporated herein above) whose output is received by a rules engine that determines whether risk rules are triggered.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for detecting whether an entity's collection of processes used during a prediction period is abnormal compared to a historical set of processes observed, the method comprising:
 performing the following with respect to a training period:
  for each of a plurality of monitored processes, calculating a global risk probability of the process being used for a malicious attack, wherein a global risk probability for a process is based on the execution history of the process across all entities during the training period;
  for each unique monitored process-entity combination observed in the training period, calculating a local risk probability of the process being used on the entity for a malicious attack, wherein the local risk probability is based on the global risk probability of the process and the execution history of the process on the entity during the training period;
  computing a plurality of training-period risk scores for each entity, wherein each training-period risk score for an entity is obtained by summing up the local risk probabilities of the monitored processes executed by the entity during an interval within the training period;
 performing the following during the prediction period:
  computing a prediction-period risk score for each entity by summing up the risk score of each unique monitored process executed by the entity during the prediction period, wherein for each monitored process-entity combination observed during the prediction period the risk score is the local risk probability for the monitored process-entity combination in response to the monitored process-entity combination being observed during the training period, and the risk score is the global risk probability for the monitored process-entity combination in response to the combination not being observed during the training period;
  for each entity, determining whether the entity's prediction-period risk score is anomalous compared to the entity's training-period risk scores; and
  displaying alerts in a user interface for anomalous prediction-period risk scores.

2. The method of claim 1, wherein a Bayesian framework is used to calculate the global and local risk probabilities.

3. The method of claim 1, wherein determining whether an entity's prediction-period risk score is anomalous comprises:
 calculating a p-value of the entity's prediction-period risk score compared to the training-period risk scores for the entity;
 comparing the p-value to a threshold; and
 determining the entity's prediction-period risk score is anomalous in response to the p-value being below the threshold.

4. The method of claim 1, further comprising ranking anomalous risk scores for the prediction period according to a degree of anomaly.

5. The method of claim 4, wherein alerts for anomalous risk scores include a risk level for each score based on the score's ranking.

6. The method of claim 4, wherein alerts are displayed only for a subset of the anomalous risk scores, and the subset is selected based on the rankings.

7. The method of claim 1, wherein the prediction period is a day and wherein the training-period risk scores are daily risk scores for each day in the training period.

8. The method of claim 1, wherein the training period is a sliding window of N days, and wherein the prediction period is a sliding window of one day after each training period.

9. A non-transitory computer-readable medium comprising a computer program, that, when executed by a computer system enables the computer system to perform the following method for detecting whether an entity's collection of processes used during a prediction period is abnormal compared to a historical set of processes observed, the method comprising:

performing the following with respect to a training period:

for each of a plurality of monitored processes, calculating a global risk probability of the process being used for a malicious attack, wherein a global risk probability for a process is based on the execution history of the process across all entities during the training period;

for each unique monitored process-entity combination observed in the training period, calculating a local risk probability of the process being used on the entity for a malicious attack, wherein the local risk probability is based on the global risk probability of the process and the execution history of the process on the entity during the training period;

computing a plurality of training-period risk scores for each entity, wherein each training-period risk score for an entity is obtained by summing up the local risk probabilities of the monitored processes executed by the entity during an interval within the training period;

performing the following during the prediction period:

computing a prediction-period risk score for each entity by summing up the risk score of each unique monitored process executed by the entity during the prediction period, wherein for each monitored process-entity combination observed during the prediction period the risk score is the local risk score for the monitored process-entity combination in response to the monitored process-entity combination being observed during the training period, and the risk score is the global risk score for the monitored process-entity combination in response to the combination not being observed during the training period;

for each entity, determining whether the entity's prediction-period risk score is anomalous compared to the entity's training-period risk scores; and         displaying alerts in a user interface for anomalous prediction-period risk scores.

10. The non-transitory computer-readable medium of claim 9, wherein a Bayesian framework is used to calculate the global and local risk probabilities.

11. The non-transitory computer-readable medium of claim 9, wherein determining whether an entity's prediction-period risk score is anomalous comprises:

calculating a p-value of the entity's prediction-period risk score compared to the training-period risk scores for the entity;

comparing the p-value to a threshold; and determining the entity's prediction-period risk score is anomalous in response to the p-value being below the threshold.

12. The non-transitory computer-readable medium of claim 9, further comprising ranking anomalous risk scores for the prediction period according to a degree of anomaly.

13. The non-transitory computer-readable medium of claim 12, wherein alerts for anomalous risk scores include a risk level for each score based on the score's ranking.

14. The non-transitory computer-readable medium of claim 12, wherein alerts are displayed only for a subset of the anomalous risk scores, and the subset is selected based on the rankings.

15. The non-transitory computer-readable medium of claim 9, wherein the prediction period is a day and wherein the training-period risk scores are daily risk scores for each day in the training period.

16. The non-transitory computer-readable medium of claim 9, wherein the training period is a sliding window of N days, and wherein the prediction period is a sliding window of one day after each training period.

17. A computer system for detecting whether an entity's collection of processes used during a prediction period is abnormal compared to a historical set of processes observed, the system comprising:

one or more processors;

one or more memory units coupled to the one or more processors, wherein the one or more memory units store instructions that, when executed by the one or more processors, cause the system to perform the operations of:

performing the following with respect to a training period:

for each of a plurality of monitored processes, calculating a global risk probability of the process being used for a malicious attack, wherein a global risk probability for a process is based on the execution history of the process across all entities during the training period;

for each unique monitored process-entity combination observed in the training period, calculating a local risk probability of the process being used on the entity for a malicious attack, wherein the local risk probability is based on the global risk probability of the process and the execution history of the process on the entity during the training period;

computing a plurality of training-period risk scores for each entity, wherein each training-period risk score for an entity is obtained by summing up the local risk probabilities of the monitored processes executed by the entity during an interval within the training period;

performing the following during the prediction period:

computing a prediction-period risk score for each entity by summing up the risk score of each unique monitored process executed by the entity during the prediction period, wherein for each monitored process-entity combination observed during the prediction period the risk score is the local risk score for the monitored process-entity combination in response to the monitored process-entity combination being observed during the training period, and the risk score is the global risk score for the monitored process-entity combination in response to the combination not being observed during the training period;

for each entity, determining whether the entity's prediction-period risk score is anomalous compared to the entity's training-period risk scores; and         displaying alerts in a user interface for anomalous prediction-period risk scores.

18. The system of claim 17, wherein a Bayesian framework is used to calculate the global and local risk probabilities.

19. The system of claim 17, wherein determining whether an entity's prediction-period risk score is anomalous comprises:

calculating a p-value of the entity's prediction-period risk score compared to the training-period risk scores for the entity;

comparing the p-value to a threshold; and determining the entity's prediction-period risk score is anomalous in response to the p-value being below the threshold.

20. The system of claim 17, further comprising ranking anomalous risk scores for the prediction period according to a degree of anomaly.

\* \* \* \* \*